(12) United States Patent
Urai et al.

(10) Patent No.: US 6,203,120 B1
(45) Date of Patent: Mar. 20, 2001

(54) BRAKING CONTROL SYSTEM FOR VEHICLE

(75) Inventors: Yoshihiro Urai; Yoichi Sugimoto; Satoshi Hada; Shoji Ichikawa, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/251,424

(22) Filed: Feb. 17, 1999

(30) Foreign Application Priority Data

Feb. 18, 1998 (JP) .................................................. 10-35789

(51) Int. Cl.$^7$ ........................................................ B60T 8/86
(52) U.S. Cl. .......................... 303/125; 340/435; 367/909; 701/301
(58) Field of Search ..................................... 303/125, 146, 303/166; 367/909; 340/935; 701/70, 71, 78, 82, 83, 300, 301

(56) References Cited

U.S. PATENT DOCUMENTS 6,026,347 * 2/2000 Schuster ................................ 701/301

FOREIGN PATENT DOCUMENTS 6-298022   10/1994 (JP) .

* cited by examiner

Primary Examiner—Christopher P. Schwartz
Assistant Examiner—C. T. Bartz
(74) Attorney, Agent, or Firm—Arent Fox Kintner Plotkin & Kahn

(57) ABSTRACT

When the behavior of a vehicle becomes unstable during an automatic braking operation for avoiding contact of the vehicle with an object, the restoring of the unstable state backed up to effectively avoid the contact of the vehicle with the object. When a radar device in the vehicle, detects the object exist ahead of the vehicle in the direction of movement of the vehicle, the possibility of the contact of the vehicle with the object is determined by a determining device from the relative positional relationship between the vehicle and the object, based on the result of the detection. When it is determined that there is the possibility of the contact, an automatic braking device operates a vacuum booster to carry out an automatic braking operation. When the unstable state of the vehicle is detected by an unstable state detector during the automatic braking operation by the automatic braking device, the automatic braking device forcibly continues the automatic braking operation, until the vehicle reaches a state in which the unstable state is not detected, whether or not it is determined that there is the possibility of the contact of the vehicle with the object. Thus, it is possible to precisely control the continuation and finishing of the automatic braking operation to reliably achieve the avoidance of the contact of the vehicle with the object, while preventing the behavior of the vehicle from further becoming unstable due to the discontinuation of the automatic braking operation.

7 Claims, 8 Drawing Sheets

BRAKING CONTROL SYSTEM FOR VEHICLE

DETAILED DESCRIPTION OF THE INVENTION

1. Field of the Invention

The present invention relates to a braking control system for a vehicle, in which a braking device is automatically operated, based on a relative positional relationship between the vehicle and an object detected by an object detecting device such as a laser radar to thereby avoid contact of the vehicle with the object.

2. Description of the Prior Art

Such a braking control system for a vehicle is known, for example, in Japanese Patent Application Laid-open No. 6-298022. This braking control system is designed so that contact of the vehicle with the object can be avoided only by the steering operation, and the avoidance of the contact is performed by the steering operation without an automatic braking operation. In a case of emergency where the contact of the vehicle with the object cannot be avoided with only the steering operation, the automatic braking operation is carried out to perform the avoidance of the contact.

When the automatic braking operation has been carried out to avoid the contact of the vehicle with another vehicle traveling ahead of the vehicle (which will be referred to as a preceding vehicle hereinafter), the behavior of the vehicle may become unstable causing a yaw motion in some cases. For example, this may occur when road surface friction coefficients are different between left and right wheels. In such a case, when the longitudinal axis of a vehicle body is deflected laterally due to the yaw motion, whereby the object detecting device does not detect the preceding vehicle, there is a possibility that it is determined that contact of the vehicle with the preceding vehicle has been eliminated, whereby the automatic braking operation is discontinued. However, when the automatic braking operation is discontinued in a state in which the behavior of the vehicle is unstable, the lateral force of a tire may be suddenly increased, whereby the behavior of the vehicle may in some cases, fall into a further unstable state.

SUMMARY OF THE INVENTION

The present invention has been accomplished with the above circumstance in view, and it is an object of the present invention to ensure that when the behavior of the vehicle becomes unstable during the automatic braking operation for avoiding contact of the vehicle with an object, the restoration of the vehicle is backed up to effectively avoid the contact of the vehicle with the object.

To achieve the above object, there is provided a braking control system for a vehicle, comprising an object detecting device for detecting an object existing ahead of a vehicle in the direction of movement of the vehicle, a braking device for braking the vehicle, a determining means for determining the possibility of contact of the vehicle with the object from the relative positional relationship between the vehicle and the object, based on the result of the detection by the object detecting device, and an automatic braking means for carrying out an automatic braking operation by operating the braking device based on the result of the detection by the determining means. The braking control system further includes an unstable state detecting means for detecting an unstable state of the vehicle, so that when the unstable state of the vehicle has been detected by the unstable state detecting means during the automatic braking operation carried out by the braking device, the automatic braking operation is forcibly continued by the automatic braking means, until the vehicle reaches a state in which the unstable state is not detected.

With the above arrangement, when the object detecting device detects the object existing ahead of the vehicle in the direction of movement of the vehicle, the determining means determines the possibility of contact of the vehicle with the object based upon the relative positional relationship between the vehicle and the object, as a function of the result of such detection. When it is determined that there is the possibility of the contact, the automatic braking means operates the braking device to carry out the automatic braking operation to avoid the contact of the vehicle with the object. When the unstable state of the vehicle is detected by the unstable state detecting means during the automatic braking operation by the automatic braking means, the automatic braking means forcibly continues the automatic braking operation, until the vehicle reaches the state in which the unstable state is not detected, irrespective of whether or not the determining means determines that there is the possibility of the contact of the vehicle with the object. Therefore, it is possible to precisely control the continuation and finishing of the automatic braking operation, to reliably achieve the avoidance of the contact of the vehicle with the object, while preventing the behavior of the vehicle from becoming unstable due to the discontinuation of the automatic braking operation.

The unstable state detecting means detects the unstable state based on the lateral behavior of the vehicle. With this arrangement, the unstable state of the vehicle is detected, based on the lateral behavior of the vehicle and therefore, can be detected easily and precisely. The lateral behavior of the vehicle includes a yaw motion and a side slip motion of the vehicle.

Further, there is provided a braking control system for a vehicle, comprising an object detecting device for detecting an object existing ahead of a vehicle in the direction of movement of the vehicle, a braking device for braking the vehicle, a determining means for determining the possibility of contact of the vehicle with the object based upon the relative positional relationship between the vehicle and the object, as a function of the result of the detection by the object detecting device, and an automatic braking means for carrying out an automatic braking operation by operating the braking device based on the result of the detection by the determining means. The braking control system further includes a vehicle behavior inhibiting means adapted to carry out a spin preventing control operation by detecting the lateral behavior of the vehicle to vary the distribution of a braking force to the left and right wheels. Thus, when the vehicle behavior inhibiting means is being operated during the automatic braking operation by the braking device, the automatic braking operation is forcibly continued by the automatic braking means based on the operational state of the vehicle behavior inhibiting means.

With the above arrangement, when the object detecting device detects the object existing ahead of the vehicle in the direction of movement of the vehicle, the determining means determines the possibility of the contact of the vehicle with the object from the relative positional relationship between the vehicle and the object, based on the result of such detection. When it is determined that there is the possibility of the contact, the automatic braking means operates the braking device to carry out the automatic braking operation to avoid the contact of the vehicle with the object. When the lateral behavior of the vehicle is detected by the vehicle behavior inhibiting means, the spin preventing control operation is carried out by operating the braking device with the automatic braking means, which operates to vary the distribution of the braking force to left and right wheels. When the vehicle behavior inhibiting means is being operated during the automatic braking operation by the automatic braking means, the automatic braking means forcibly continues the automatic braking operation based on the operational state of the vehicle behavior inhibiting means, whether or not the determining means determines that there is the possibility of the contact of the vehicle with the object. Therefore, it is possible to precisely control the continuation and finishing of the automatic braking operation to reliably achieve the avoidance of the contact of the vehicle with the object, while preventing the behavior of the vehicle from further becoming unstable due to the discontinuation of the automatic braking operation.

BRIEF DESCRIPTION OF THE DRAWINGS

The mode for carrying out the present invention will now be described by way of embodiments shown in the accompanying drawings.

DETAILED DESCRIPTION OF THE PREFERRED EMBODIMENTS

Figure 1:
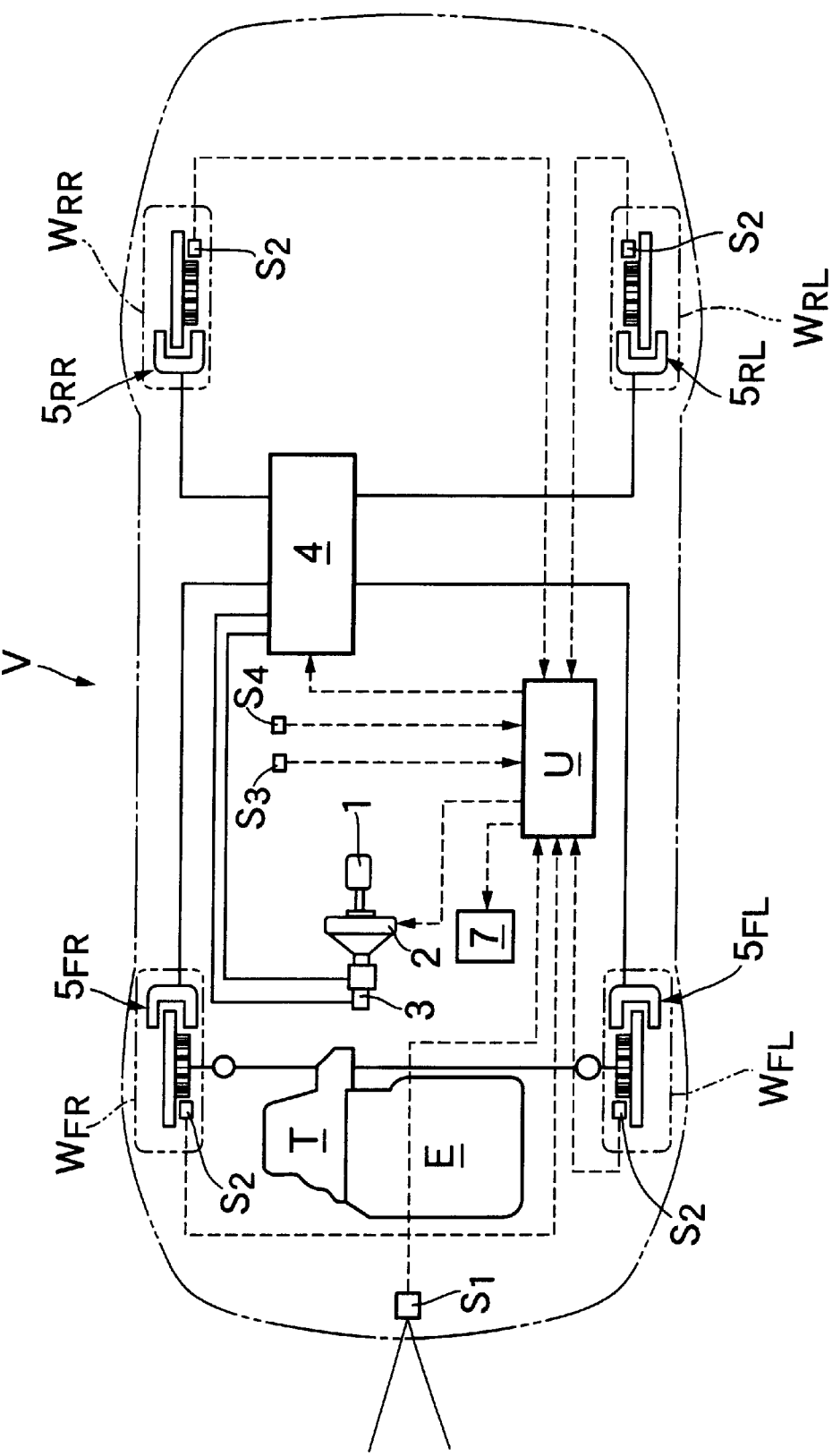
FIG. 1 is an illustration of the entire arrangement of a vehicle provided with a braking control system of the present invention.

As shown in FIG. 1, a four-wheel vehicle V provided with a braking control system according to embodiments of the present invention includes left and right front wheels $W_{FL}$ and $W_{FR}$ which are driving wheels to which the driving force from an engine E is transmitted through a transmission T, and left and right rear wheels $W_{RL}$ and $W_{RR}$ which are follower wheels. A brake pedal 1 operated by a driver, is connected to a master cylinder 3 through an electronically controlled vacuum booster 2 which is a braking device in the first embodiment. The electronically controlled vacuum booster 2 is adapted to mechanically boost the depression force on the brake pedal 1 to operate the master cylinder 3, and also to operate the master cylinder 3 by means of a signal from an electronic control unit U without recourse to the operation of the brake pedal 1, during an automatic braking operation. An input rod of the electronically controlled vacuum booster 2 is connected to the brake pedal 1 through a lost motion mechanism, so that the brake pedal 1 remains at an initial position, even if the electronically controlled vacuum booster 2 is operated by the signal from the electronic control unit U, whereby the input rod is moved forwards.

The master cylinder 3 is connected to brake calipers $5_{FL}$, $5_{FR}$, $5_{RL}$ and $5_{RR}$ mounted on the front wheels $W_{FL}$ and $W_{FR}$ and the rear wheels $W_{RL}$ and $W_{RR}$, respectively, through a hydraulic pressure control device 4. The hydraulic pressure control device 4 individually controls the hydraulic braking pressure transmitted to the front wheels $W_{FL}$ and $W_{FR}$ and the rear wheels $W_{RL}$ and $W_{RR}$ by the signal from the electronic control unit $U_1$ to carry out the antilock brake control which inhibits the locking of the wheels.

Connected to the electronic control unit U are a radar device $S_1$ adapted to transmit an electromagnetic wave such as a radar beam forward of the vehicle to detect a relative distance and a relative speed between an object such as another vehicle traveling ahead of the vehicle and the vehicle on the basis of a reflected wave, wheel speed sensors $S_2$ for detecting rotational speeds of the front wheels $W_{FL}$ and $W_{FR}$ and the rear wheels $W_{RL}$ and $W_{RR}$, a yaw rate sensor $S_3$ for detecting a yaw rate 4 of the vehicle V, and a lateral acceleration sensor $S_4$ for detecting a lateral acceleration Yg of the vehicle V.

The electronic control unit U controls the operations of the electronically controlled vacuum booster 2, the hydraulic pressure control device 4 and the operation of a warning device 7 comprising a loudspeaker, based on a signal from the radar device $S_1$ which is the object detecting device according to the embodiments of the present invention and signals from the sensors $S_2$, $S_3$ and $S_4$.

Figure 2:
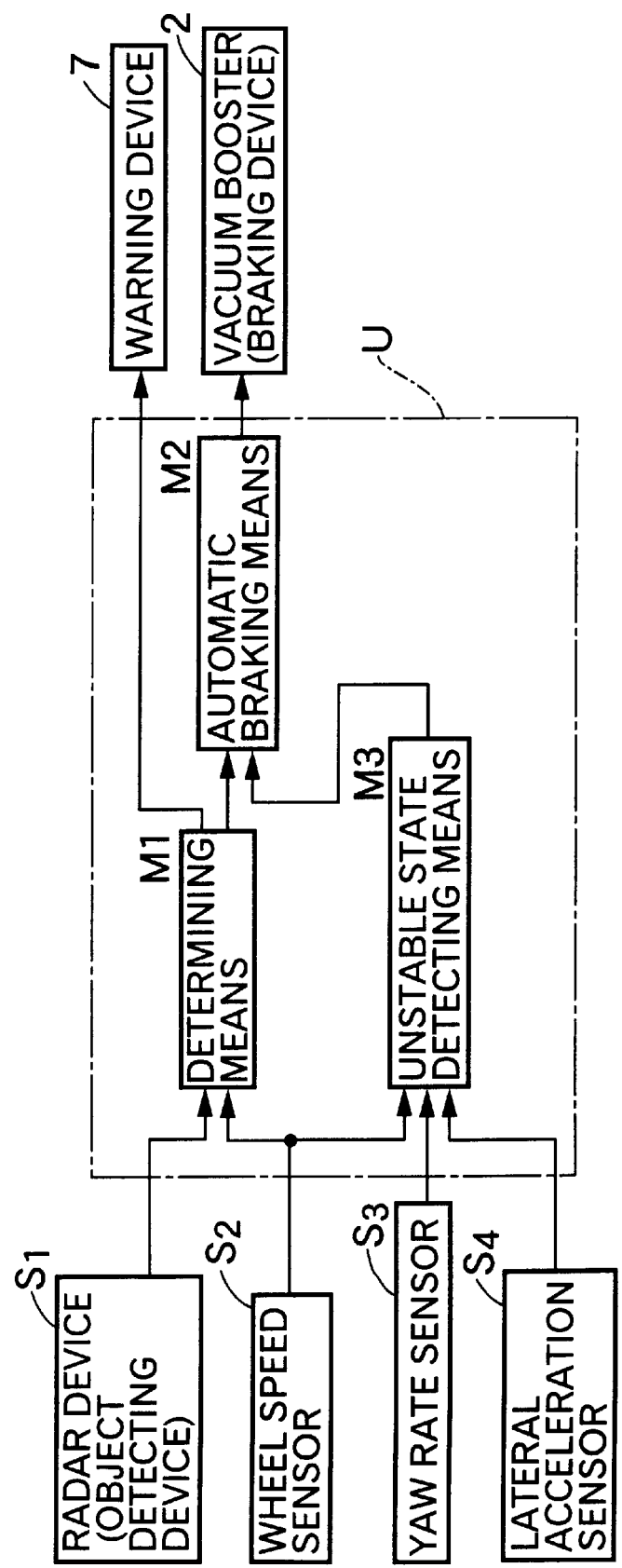
FIG. 2 is a block diagram showing the circuit arrangement of an electronic control thereof.

As shown in FIG. 2, the electronic control unit U is provided with a determining means M1, an automatic braking means M2, and an unstable-state detecting means M3. The determining means M1 determines whether it is necessary to carry out the warning and/or the automatic braking operation to avoid the contact of the vehicle with the object, based on the relative distance and the relative speed between the vehicle and the object detected by the radar device $S_1$ and the vehicle speed and acceleration of the vehicle detected by the wheel speed sensors $S_2$. More specifically, when the relative distance between the vehicle and the object is smaller than a predetermined threshold value, and when the relative speed between the vehicle and the object is higher than a predetermined threshold value, it is determined that there is a high possibility of contact of the vehicle with the object. In this case, when the vehicle speed and the positive acceleration of the vehicle are large, a further precise determination can be carried out by correcting the threshold values based on the magnitudes of the speed and acceleration of the vehicle, in consideration of the difficulty to avoid contact by the braking operation, or to avoid contact by the steering operation. Further, it is possible to take into consideration, the combination of the amount of lateral overlapping of the vehicle and the object detected by the radar device $S_1$ and the turning state of the vehicle detected by the yaw rate sensor $S_3$.

When it is determined by the determining means M1 that there is a possibility of the contact of the vehicle with the object, the warning device 7 is operated to alert a driver for spontaneous braking by a buzzer sound or by voice, and the automatic braking means M2 operates the electronically controlled vacuum booster 2 to generate a hydraulic braking pressure in the master cylinder 3. The brake calipers $5_{FL}$, $5_{FR}$, $5_{RL}$ and $5_{RR}$ are operated by the hydraulic braking pressure to carry out the automatic braking operation.

On the other hand, the unstable-state detecting means M3 detects whether the vehicle V is in an unstable state, based on the signals from the wheel speed sensors $S_2$, the yaw rate sensor $S_3$ and the lateral acceleration sensor $S_4$. When the unstable-state detecting means M3 detects an unstable state of the vehicle V, the automatic braking means M2 forcibly continues the automatic braking operation for avoiding the contact of the vehicle with the object, irrespective of the result of the determination by the determining means M1, that is, even after the vehicle reaches the state in which the determining means M1 does not determine that there is the possibility of contact of the vehicle with the object. The braking operation provided by the automatic braking means M2 is finished when the vehicle reaches the state in which the determining means M1 does not determine that there is the possibility of contact of the vehicle with the object and the unstable-state detecting means M3 does not detect the unstable state of the vehicle V.

Figure 4:
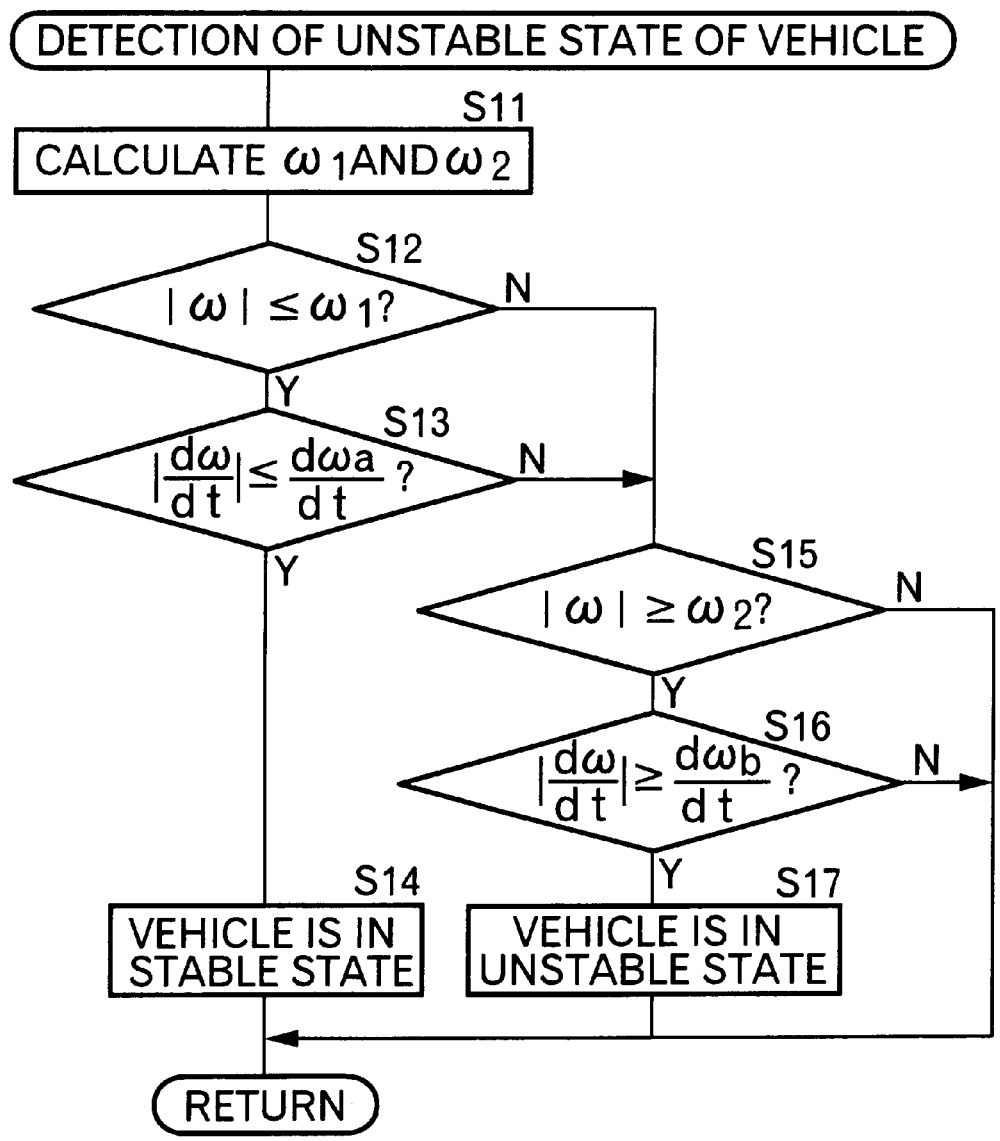
FIG. 4 is a flow chart for a routine for detecting the unstable state of the vehicle due to a yaw rate.
Figure 5:
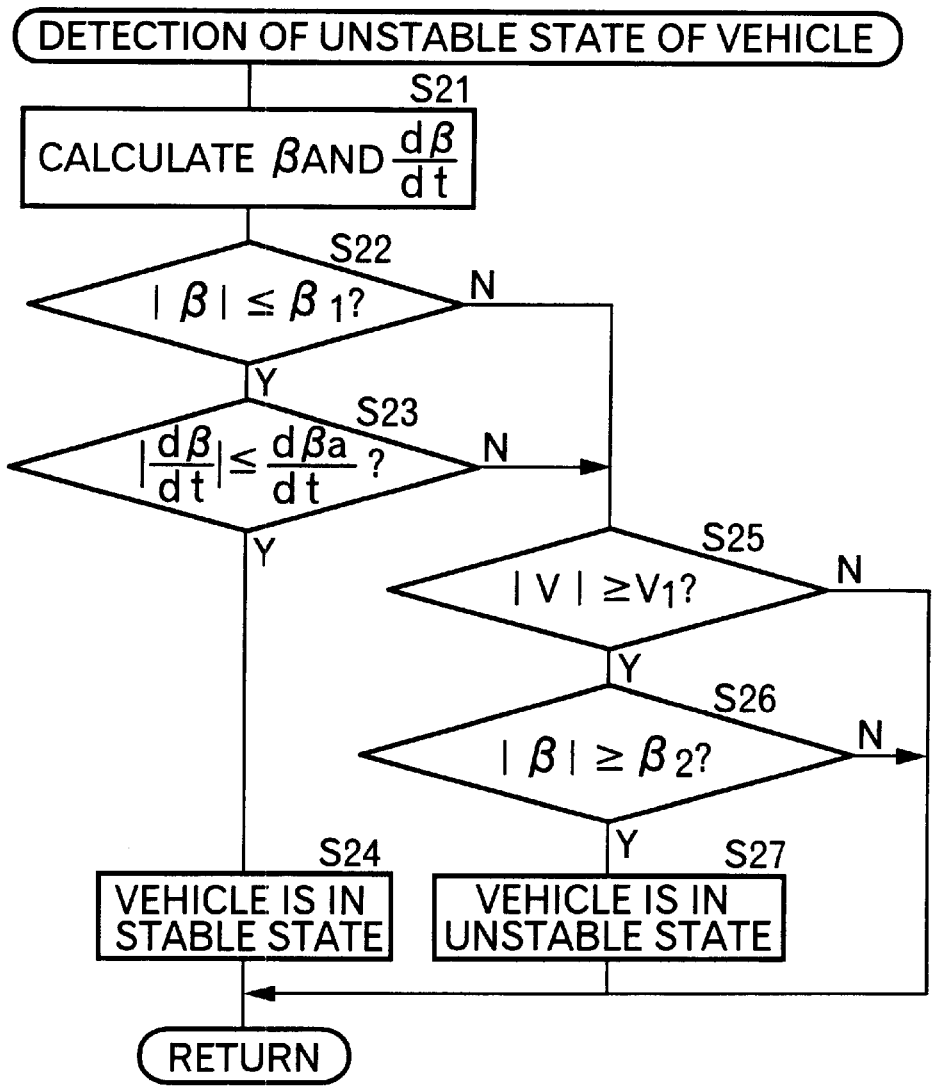
FIG. 5 is a flow chart for a routine for detecting the unstable state of the vehicle due to a side slip angle.

The above-described operation will be further described in detail with reference to flow charts in FIGS. 3 to 5.

Figure 3:
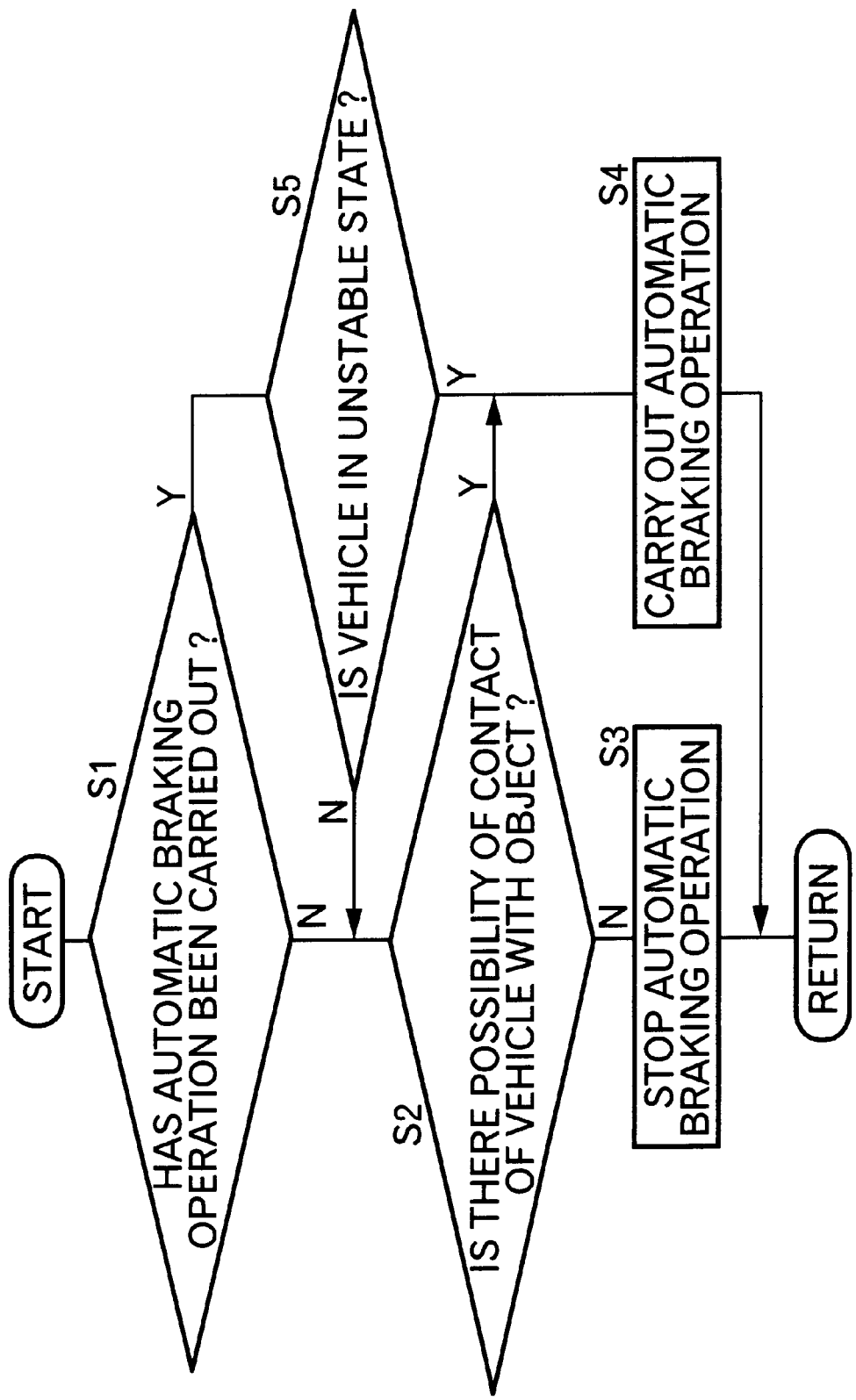
FIG. 3 is a flow chart for a main routine according to the embodiments of the present invention.

If it is determined by the determining means M1 at Step S2 that there is not the possibility of contact of the vehicle with the object, when the answer at Step S1 in the flow chart in FIG. 3 is NO, i.e., when the automatic braking operation is not being carried out, the automatic braking operation by the automatic braking means M2 is not carried out at Step S3. On the other hand, if it is determined at Step S2 that there is the possibility of the contact of the vehicle with the object, the processing is advanced to Step S4, at which the automatic braking operation by the automatic braking means M2 is carried out. When the automatic braking operation is carried out, the warning device 7 is operated to inform the driver that the automatic braking operation is being carried out.

If the unstable-state detecting means M3 does not detect the unstable state of the vehicle V at Step S5 when the answer at Step S1 is YES, i.e., during carrying-out of the automatic braking operation, the processing is advanced to Step S2, at which the control of the automatic braking operation based on the result of the determination by the determining means M1 is carried out. On the other hand, when the unstable-state detecting means M3 detects the unstable state of the vehicle V at Step S5, the automatic braking operation is continued at Step S4, until the unstable state is eliminated. When the unstable state is eliminated, the processing is shifted to the Step S2, at which the control of the automatic braking operation based on the result of the determination by the determining means M1 is restored.

In this way, when the vehicle V falls into the unstable state during carrying-out of the automatic braking operation, the carrying-out of the automatic braking operation is continued, until the elimination of the unstable state is detected by the unstable-state detecting means M3 irrespective of the result of the determination of the possibility of contact by the determining means M1. Therefore, it is possible to effectively avoid contact of the vehicle with the object, while also preventing the unstable state of the vehicle V from being further degraded due to the discontinuation of the automatic braking operation.

A technique for detecting the unstable state of the vehicle V based on the yaw rate 4 will be described below with reference to the flow chart in FIG. 4.

The vehicle V is defined as being stable in an initial state. First, at Step S11, a first threshold value $\omega_1$ and a second threshold value $\omega_2$ of yaw rate $\omega$ as a criterion of the determination, are calculated. The first threshold value $\omega_1$ is a yaw rate $\omega$ such that the vehicle V can be turned with sufficient stability, at a low lateral acceleration Yg. The first threshold value $\omega_1$ is calculated, for example, according to the following equation:

$$\omega_1 = 0.2 G/v$$

wherein G represents a gravity acceleration, and v represents a vehicle speed calculated from the outputs from the wheel speed sensors $S_2$. The second threshold value $\omega_2$ is a maximum yaw rate $\omega$ such that the vehicle V can be turned. The second threshold value $\omega_2$ is calculated, for example, according to the following equation:

$$\omega_2 = \{(1G)^2 - \text{deceleration}^2\}^{1/2}/v$$

The deceleration is given by the differential value dv/dt of the vehicle speed v. The second threshold value $\omega_2$ includes a minimum value of 0.2G/v and hence, $\omega_1 \leq \omega_2$.

Then, at Step S12, the absolute value $|\omega|$ of the yaw rate $\omega$ detected by the yaw rate sensor $S_3$ is compared with the first threshold value $\omega_1$. If $|\omega| \leq \omega_1$, the processing is advanced to Step S13. The absolute value $|d\omega/dt|$ of the differential value of the yaw rate $\omega$ is compared with the threshold value d$\omega$a/dt at Step S13. If $|d\omega/dt| \leq d\omega a/dt$, it is determined at Step S14 that the vehicle V is in the stable state. The value of d$\omega$a/dt is in a range of 10 to 20 deg/sec.

If $|\omega| > \omega_1$ at Step S12, it is determined that there is a possibility that the vehicle V may be in the unstable state, and the processing is advanced to Step S15.

If $|d\omega/dt| > d\omega a/dt$ at Step S13 even if $|\omega| \leq \omega_1$ at Step S12, the decision at Step S15 is also NO and the state determined in the last processing loop is maintained.

If the result of the comparison of the absolute value $|\omega|$ of the yaw rate $\omega$ with the second threshold value $\omega_2$ at Step S15 is $|\omega| > \omega_2$, and the result of the comparison of the absolute value $|d\omega/dt|$ of the differential value of the yaw rate $\omega$ with the threshold value d$\omega$b/dt at Step S16 is $|d\omega/dt| \geq d\omega b/dt$, it is determined at Step S17 that the vehicle V is in the unstable state. The value of d$\omega$b/dt is, for example, in a range of 30 to 40 deg/sec.

If $|d\omega/dt| < d\omega b/dt$ at Step S16 even if $|\omega| < \omega_2$ at Step S15, or if $|\omega| \geq \omega_2$ at Step S15, the state determined in the last processing loop is maintained.

Figure 8:
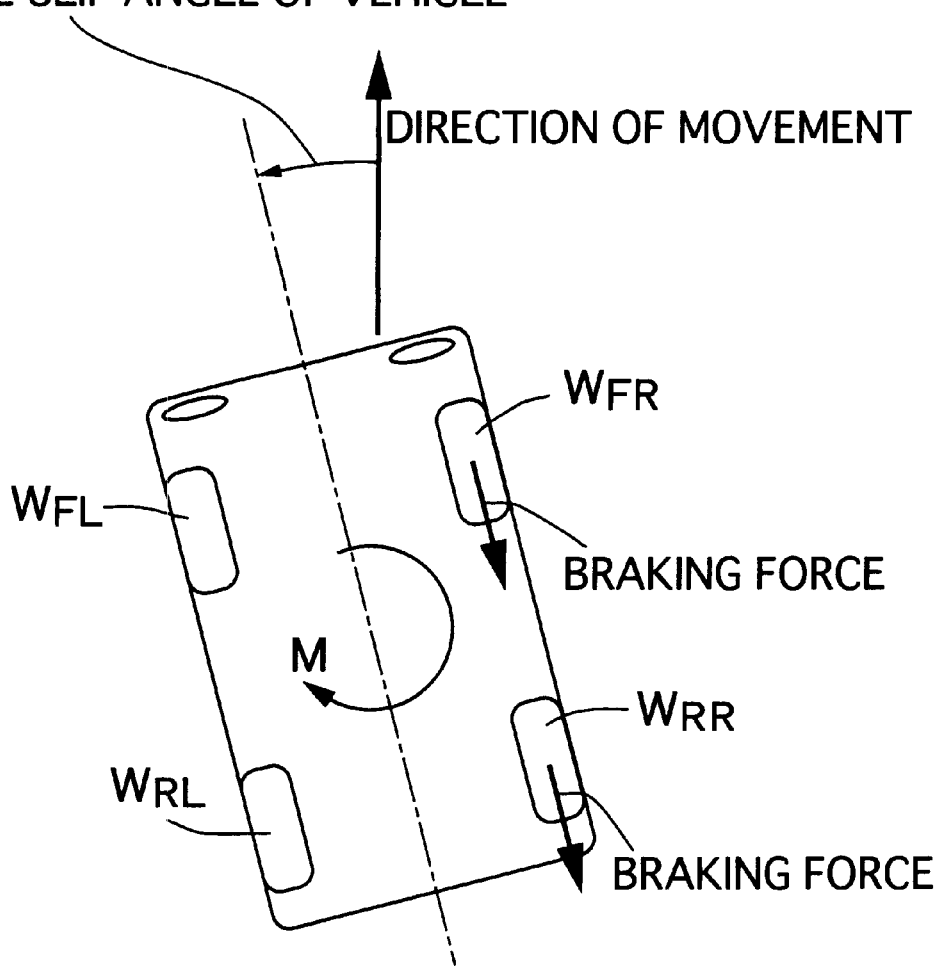
FIG. 8 is an illustration for explaining the operation of a vehicle behavior inhibiting device.

A technique for detecting the unstable state of the vehicle V based on a side slip angle $\beta$ will be described below with reference to the flow chart in FIG. 5. The side slip angle $\beta$ is defined as an angle formed by a direction of movement of the vehicle V and a longitudinal axis of the vehicle body, as shown in FIG. 8.

The vehicle V is defined as being stable in an initial state. First, at Step S21, the side slip angle $\beta$ of the vehicle V is calculated based on the vehicle speed v detected by the wheel speed sensors $S_2$, the yaw rate $\omega$ detected by the yaw rate sensor $S_3$, and the lateral acceleration Yg detected by the lateral acceleration sensor $S_4$, and a rate d$\beta$/dt of variation in the side slip angle $\beta$ is calculated as a differential value of the side slip angle $\beta$. At subsequent Step S22, the absolute value $|\beta|$ of the side slip angle $\beta$ is compared with a first threshold value $\beta_1$ (for example, 5 deg). If $|\beta| \leq \beta_1$, the processing is advanced to Step S23. The absolute value $|d\beta/dt|$ of the rate d$\beta$/dt of variation in the side slip angle $\beta$ is compared with a threshold value d$\beta$a/dt (for example, 10 to 20 deg/sec) at Step S23. If $|d\beta/dt| \leq d\beta a/dt$, it is determined at Step S24 that the vehicle V is in the stable state.

If $|\beta| > \beta_1$ at Step S22, it is determined that there is a possibility that the vehicle V may be in the unstable state, progressing to Step S25.

If $|d\omega/dt| > d\beta a/dt$ at Step S23 even if $|\beta| \leq \beta_1$ at Step S22, the decision at Step S25 is also NO and the state determined in the last processing loop is maintained.

If the result of comparison of the vehicle speed v with a threshold value $v_1$ at Step S25 (for example, 40 km/sec) is $v \geq v_1$, and the result of comparison of the absolute value $|\beta|$ of the side slip angle $\beta$ with a second threshold value $\beta_2$ (for example, 5 to 10 deg) at Step S26 is $|\beta| \geq \beta_2$, it is determined at Step S27 that the vehicle V is in the unstable state.

If $|\beta| < \beta_2$ at Step S26 even if $v < v_1$ at Step S25, or if $v \geq v_1$ at Step S25, the state determined in the last processing loop is maintained.

As described above, the unstable state of the vehicle V can easily and accurately be detected by monitoring the yaw motion and the side slip motion of the vehicle V.

A second embodiment of the present invention will now be described with reference to FIGS. 6 to 8.

The electronically controlled vacuum booster 2 (see FIG. 1) has been employed as the braking device in the first embodiment, but a vacuum booster in the second embodiment is of a usual type rather than the electronically controlled type. Instead, the hydraulic pressure control device 4 disposed between the master cylinder 3 and the brake calipers $5_{FL}$, $5_{FR}$, $5_{RL}$ and $5_{RR}$ comprises a braking device in the second embodiment.

Figure 6:
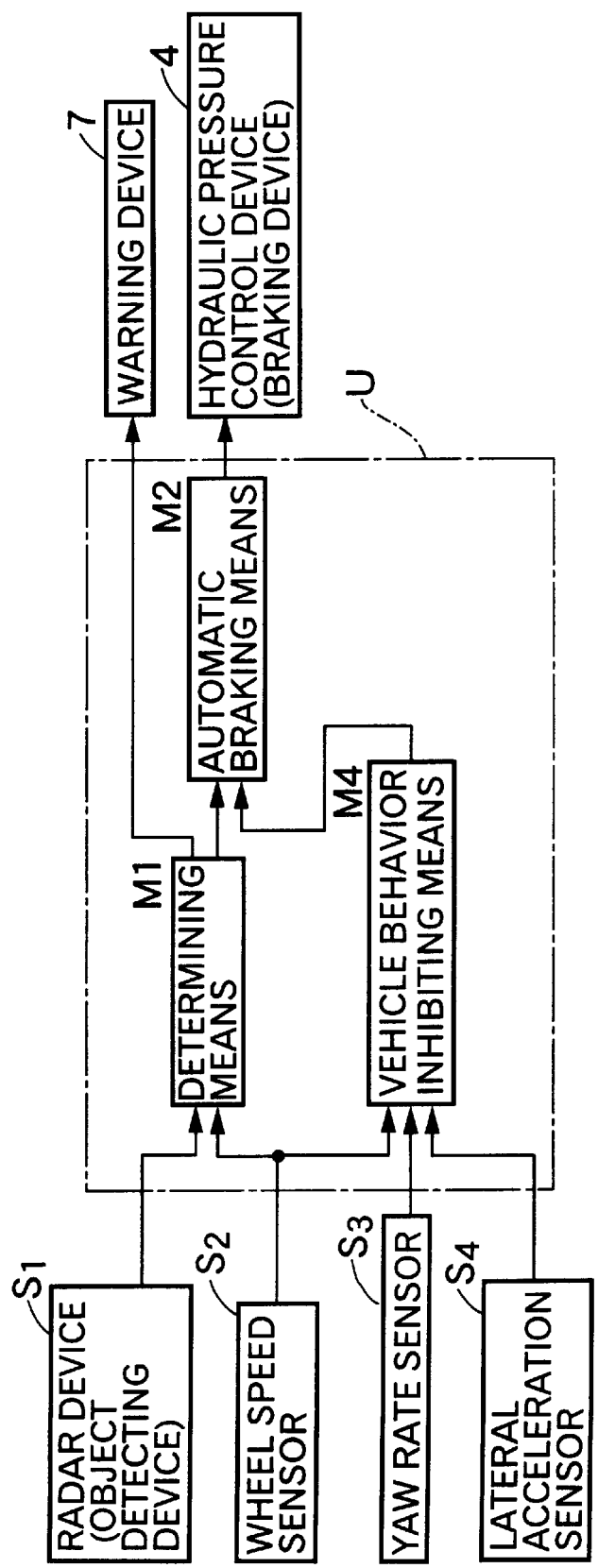
FIG. 6 is a block diagram showing the circuit arrangement of an electronic control unit according to a second embodiment of the present invention.

As shown in FIG. 6, the electronic control unit U in the second embodiment includes a vehicle behavior inhibiting means M4 adapted to individually control the braking forces for the left and right wheels to inhibit the spinning of the vehicle V in place of the unstable-state detecting means M3 used in the first embodiment. When it is detected based on outputs from the wheel speed sensors $S_2$, the yaw rate sensor $S_3$ and the lateral acceleration sensor $S_4$, that the vehicle V has fallen into a side slipping state shown in FIG. 8, the vehicle behavior inhibiting means M4 controls the braking force for the wheels $W_{FL}$, $W_{FR}$, $W_{RL}$ and $W_{RR}$ through the hydraulic pressure control device 4, in order to eliminate the side slipping state to avoid the spinning of the vehicle V.

The structure of the hydraulic pressure control device 4 comprising the braking device in the second embodiment will be described below with reference to FIG. 7.

The master cylinder 3 includes two output hydraulic chambers 11 and 12. One of the output hydraulic chambers 11 is connected to the brake calipers $5_{FL}$ and $5_{RR}$ of the left front wheel $W_{FL}$ and the right rear wheel $W_{RR}$ through the hydraulic pressure control device 4, and the other output hydraulic chamber 12 is connected to the brake calipers $5_{FR}$ and $5_{RL}$ of the right front wheel $W_{FR}$ and the left rear wheel $W_{RL}$ through the hydraulic pressure control device 4. Only a hydraulic pressure system connecting the one output hydraulic chamber 11 to the brake calipers $5_{FL}$ and $5_{RR}$ of the left front wheel $W_{FL}$ and the right rear wheel $W_{RR}$ is shown in FIG. 7, but a hydraulic pressure control system connecting the other output hydraulic chamber 12 to the brake calipers $5_{FR}$ and $5_{RL}$ of the right front wheel $W_{FR}$ and the left rear wheel $W_{RL}$ is of the same structure. As a representation, the structure of the hydraulic pressure system for the left front wheel $W_{FL}$ and the right rear wheel $W_{RR}$ will be described below.

A first switch-over valve 14 comprising a solenoid valve is provided in a hydraulic passage $L_1$ extending from the output hydraulic chamber 11 of the master cylinder 3. A second switch-over valve 15 and a third switch-over valve 16 each comprising a solenoid valve are provided in a pair of hydraulic passages $L_2$ and $L_3$, respectively, which is bifurcated at a downstream portion of the first switch-over valve 14 and is connected to the brake caliper $5_{FL}$ of the left front wheel $W_{FL}$ and the brake caliper $5_{RR}$ of the right rear wheel $W_{RR}$, respectively. A hydraulic pump 18 is connected to a junction between the hydraulic passages $L_2$ and $L_3$ through a check valve 17, and a relief valve 19 is connected between a downstream portion of the check valve 17 and an upstream portion of the first switch-over valve 14. Solenoids $14_1$, $15_1$ and $16_1$ of the first, second and third switch-over valves 14, 15 and 16 are connected to and controlled by the electronic control unit U.

Figure 7:
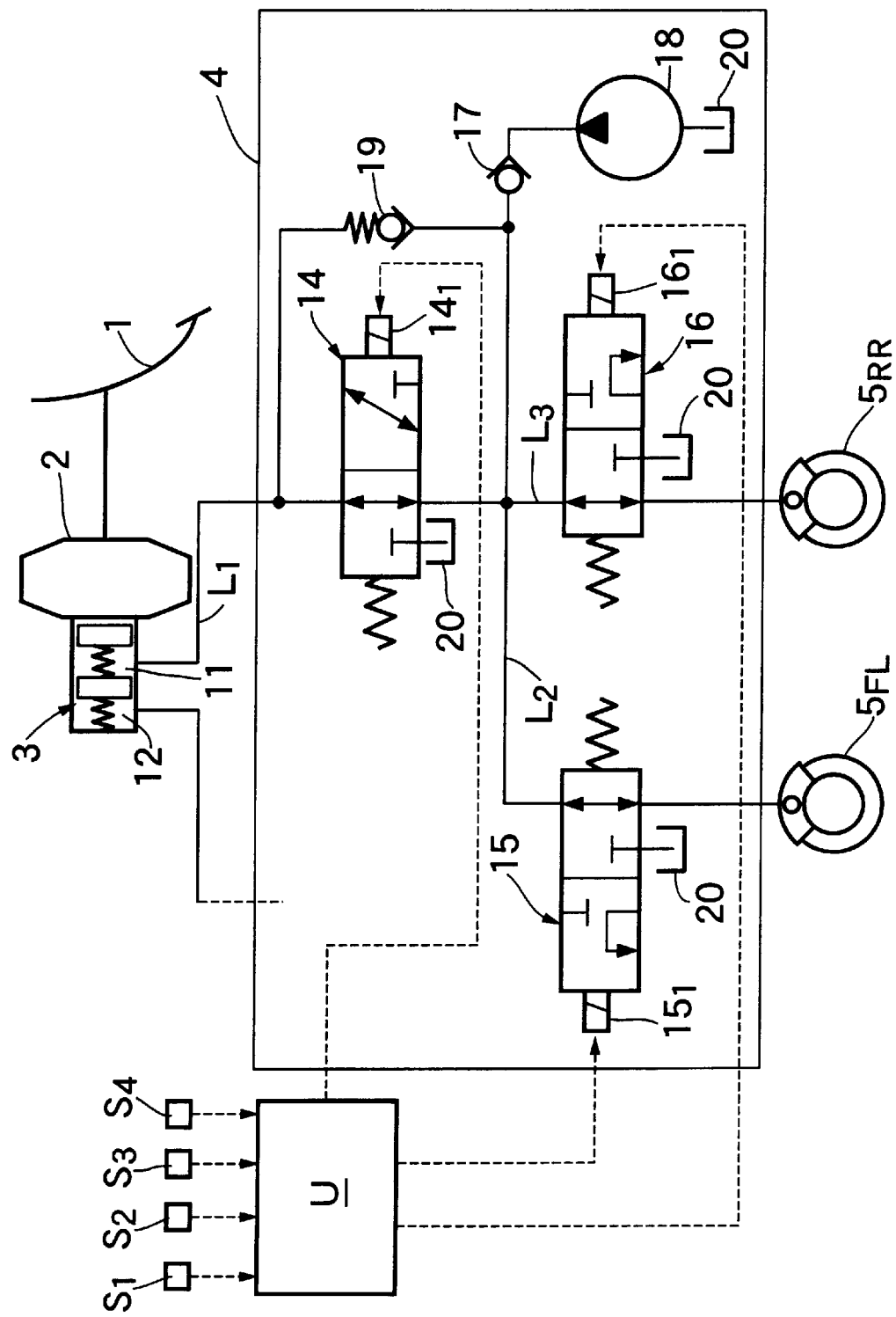
FIG. 7 is a diagram showing the arrangement of a hydraulic pressure control device.

When the manual baking operation is to be conducted, any of the solenoids $14_1$, $15_1$ and $16_1$ are in their non-energized states shown in FIG. 7, and the output hydraulic chamber 11 in the master cylinder 3 is connected directly to the brake caliper $5_{FL}$ of the left front wheel $W_{FL}$ and the brake caliper $5_{RR}$ of the right rear wheel $W_{RR}$. During automatic braking operation, the solenoid $14_1$ of the first switch-over valve 14 is brought into an energized state, so that the output hydraulic chamber 11 in the master cylinder 3 is disconnected from the brake caliper $5_{FL}$ of the left front wheel $W_{FL}$ and the brake caliper $5_{RR}$ of the right rear wheel $W_{RR}$, and connected to a reservoir 20.

If the solenoids $15_1$ and $16_1$ of the second and third switch-over valves 15 and 16 are brought into their non-energized states shown in FIG. 7, in a state in which the solenoid $14_1$ of the first switch-over valve 14 has been energized, the hydraulic braking pressure generated in the hydraulic pump 18 is transmitted to the brake caliper $5_{FL}$ of the left front wheel $W_{FL}$ and the brake caliper $5_{RR}$ of the right rear wheel $W_{RR}$, to brake the left front wheel $W_{FL}$ and the right rear wheel $W_{RR}$. If the solenoids $15_1$ and $16_1$ of the second and third switch-over valves 15 and 16 are brought into their energized states, the brake calipers $5_{FL}$ and $5_{RR}$ are put into communication with the reservoir 20, whereby the braking forces for the left front wheel $W_{FL}$ and the right rear wheel $W_{RR}$ are released. Therefore, the braking forces for the left front wheel $W_{FL}$ and the right rear wheel $W_{RR}$ can be controlled independently to any magnitude by duty controlling the solenoids $15_1$ and $16_1$ of the second and third switch-over valves 15 and 16 independently. The braking forces for the right front wheel $W_{FR}$ and the left rear wheel $W_{RL}$ can also be controlled independently to any magnitude in the same manner.

If the determining means M1 determines that there is a possibility of the contact of the vehicle with the object, the hydraulic pressure control device 4 is operated by a command from the automatic braking means M2, whereby hydraulic braking pressures are supplied to the brake calipers $5$FL, $5_{FR}$, $5_{RL}$ and $5_{RR}$ of the wheels $W_{FL}$, $W_{FR}$, $W_{RL}$ and $W_{RR}$ in order to avoid the contact of the vehicle with the object by the automatic braking operation. If the vehicle behavior inhibiting means M4 detects a lateral behavior of the vehicle V, e.g., a leftward side slipping as shown in FIG. 8, a rightward yaw moment M is generated in the vehicle V by braking the right front wheel $W_{FR}$ or the two right front and right rear wheels $W_{FR}$ and $W_{RR}$ by the hydraulic pressure control device 4, thereby inhibiting the leftward side slipping, and preventing the vehicle V from being fallen into a spinning state.

If the vehicle V produces side slipping when the automatic braking operation is being carried out by a command from the determining means M1, the vehicle behavior inhibiting means M4 starts the spin preventing control. During this time, when the radar device $S_1$ does not detect the object due to the side slipping of the vehicle $V_1$ the determining means M1 determines that the possibility of the contact of the vehicle V with the object is eliminated, thereby discontinuing the automatic braking operation, and only the spin preventing control is carried out. This causes a possibility that the behavior of the vehicle V may be further degraded, and a sufficient braking force for avoiding the contact may not be obtained.

In the present embodiment, however, when the vehicle behavior inhibiting means M4 is being operated during the automatic braking operation by the command from the determining means M1, the automatic braking operation for avoiding the contact of the vehicle with the object is forcibly continued intact, even when the determining means M1 determines that the possibility of the contact of the vehicle with the object has been eliminated. Therefore, the automatic braking operation for avoiding the contact of the vehicle with the object and the automatic braking operation for preventing the spinning of the vehicle are carried out in parallel for a period from a time point when the lateral behavior of the vehicle V is settled down to a time point when the spinning preventing control operation by the vehicle behavior inhibiting means M4 is finished. Thus, it is possible to avoid the contact of the vehicle with the object, while preventing the spinning of the vehicle V.

Further, when the vehicle behavior inhibiting means M4 is controlling both the front and rear wheels, the automatic braking operation is continued. For example, when the vehicle behavior inhibiting means M4 is controlling only the front wheels, the automatic braking operation may be continued based on the determination of a possibility of the contact of the vehicle with the object, when there is the possibility of the contact of the vehicle with the object.

As discussed above, when the unstable state of the vehicle is detected by the unstable state detecting means during the automatic braking operation by the automatic braking means, the automatic braking means forcibly continues the automatic braking operation, until the vehicle reaches the state in which the unstable state is not detected, whether or not the determining means determines that there is the possibility of the contact of the vehicle with the object. Therefore, it is possible to precisely control the continuation and finishing of the automatic braking operation to reliably achieve the avoidance of the contact of the vehicle with the object, while preventing the behavior of the vehicle from further becoming unstable due to the discontinuation of the automatic braking operation.

The unstable state of the vehicle is detected based on the lateral behavior of the vehicle and hence, can be detected easily and precisely.

When the vehicle behavior inhibiting means is being operated during the automatic braking operation by the automatic braking means, the automatic braking means forcibly continues the automatic braking operation based on the operational state of the vehicle behavior inhibiting means, whether or not the determining means determines that there is the possibility of the contact of the vehicle with the object. Therefore, it is possible to precisely control the continuation and finishing of the automatic braking operation to reliably achieve the avoidance of the contact of the vehicle with the object, while preventing the behavior of the vehicle from further becoming unstable due to the discontinuation of the automatic braking operation.

Although the embodiments of the present invention have been described, it will be understood that the present invention is not limited to the above-described embodiments, and various modifications in design may be made without departing from the subject matter of the invention.

What is claimed is:

1. A braking control system for a vehicle, comprising:
   an object detecting device for detecting an object existing ahead of a vehicle in the direction of movement of the vehicle,
   braking device adapted to brake the vehicle,
   determining means for determining a possibility of contact of the vehicle with the object based upon a relative positional relationship between the vehicle and the object, as a function of the output of said object detecting device,
   automatic braking means for carrying out an automatic braking operation by operating said braking device based on the output of said determining means, and
   unstable state detecting means for detecting an unstable state of the vehicle, wherein when the unstable state of the vehicle is detected by said unstable state detecting means during the automatic braking operation carried out by said braking device, the automatic braking operation is forcibly continued by said automatic braking means, based on an operational state of the unstable state detecting means.

2. A braking control system for a vehicle according to claim 1, wherein said unstable state detecting means detects the unstable state based on the lateral behavior of the vehicle.

3. A braking control system as set forth in claim 1, wherein said unstable state detecting means detects the yaw rate of the vehicle.

4. A braking control system as set forth in claim 1, wherein said unstable state detecting means detects the side slip angle of the vehicle.

5. A braking control system for a vehicle, comprising:
   an object detecting device for detecting an object existing ahead of a vehicle in the direction of movement of the vehicle,
   a braking device adapted to brake the vehicle,
   determining means for determining a possibility of contact of the vehicle with the object based upon a relative positional relationship between the vehicle and the object, as a function of the output of said object detecting device, and
   automatic braking means for carrying out an automatic braking operation by operating said braking device based on the output of said determining means, and
   vehicle behavior inhibiting means for detecting lateral behavior of vehicle and varying the distribution of a braking force to left and right wheels of the vehicle as a function of detection of the lateral behavior, to thereby carry out a spin preventing control operation, wherein when said vehicle behavior inhibiting means is being operated during the automatic braking operation by the braking device, the automatic braking operation is forcibly continued by said automatic braking means based on an operational state of said vehicle behavior inhibiting means.

6. A braking control system as set forth in claim 5, wherein said vehicle behavior inhibiting means detects the yaw rate of the vehicle.

7. A braking control system as set forth in claim 5, wherein said vehicle behavior inhibiting means detects the side slip angle of the vehicle.

* * * * *